United States Patent [19]

Yocum

[11] Patent Number: 5,650,105

[45] Date of Patent: Jul. 22, 1997

[54] METHOD FOR MAKING A LOUDSPEAKER CONE WITH AN INTEGRAL SURROUND

[76] Inventor: Fred D. Yocum, Ocean Reef Club, AC 45 B, Anchor Dr., N. Key Largo, Fla. 33037

[21] Appl. No.: 472,175

[22] Filed: Jun. 7, 1995

Related U.S. Application Data

[63] Continuation-in-part of Ser. No. 248,145, May 24, 1994.

[51] Int. Cl.$^6$ ..................................... B29C 44/12
[52] U.S. Cl. .................... 264/45.5; 264/46.4; 264/46.5; 264/46.9; 264/252; 264/255
[58] Field of Search ..................... 264/252, 255, 264/45.5, 46.4, 46.9, 46.5

[56] References Cited

U.S. PATENT DOCUMENTS

| | | |
|---|---|---|
| 1,872,583 | 9/1932 | Hawley . |
| 2,302,178 | 11/1942 | Brennan . |
| 2,646,853 | 7/1953 | Pocock . |
| 2,670,807 | 3/1954 | Brown . |
| 2,734,591 | 2/1956 | Olson et al. . |
| 2,840,177 | 6/1958 | Schoengold . |
| 3,299,192 | 1/1967 | Lux . |
| 3,573,396 | 4/1971 | Schoengold . |
| 3,612,783 | 10/1971 | Schneider . |
| 3,684,052 | 8/1972 | Sotome . |
| 3,734,985 | 5/1973 | Greenberg . |
| 3,767,004 | 10/1973 | Liebscher . |
| 3,850,650 | 11/1974 | Von Bonin et al. . |
| 3,858,680 | 1/1975 | Tsuge et al. . |
| 3,864,444 | 2/1975 | Johnson . |
| 3,997,023 | 12/1976 | White . |
| 4,014,737 | 3/1977 | Brennan . |
| 4,646,874 | 3/1987 | Baitcher et al. . |
| 4,769,188 | 9/1988 | Graham et al. ............... 264/51 |
| 4,939,783 | 7/1990 | Dunning . |
| 5,047,191 | 9/1991 | Baitcher et al. ............. 264/252 |

FOREIGN PATENT DOCUMENTS

| | | |
|---|---|---|
| 1598 32 | 6/1981 | Germany . |
| 55-95497 | 7/1980 | Japan . |
| 3-60300 | 3/1991 | Japan . |
| 1260124 | 1/1972 | United Kingdom . |

*Primary Examiner*—Allan R. Kuhns
*Attorney, Agent, or Firm*—Jones, Tullar & Cooper, P.C.

[57] ABSTRACT

A method for making a novel, relatively low-cost loudspeaker cone assembly with an integral suspension rim. The method is for making a cone assembly wherein a cone body having an outer free edge is placed within an open female mold having an annular channel configured to form the suspension rim with the free edge of the cone exposed to the channel. A predetermined quantity of liquid plastic is deposited into the channel of the open mold. Next, the mold is substantially closed by a male die to seal the cone body adjacent its outer free edge. The liquid plastic is then cured under specific pressure and temperature conditions, over a selected interval, so that the resulting annular suspension rim is integrally impregnated into the free outer edge of the cone body and forms high density closed-cell outer skin surfaces in an integral sandwich construction with a low density closed-cell inner core, thereby providing improved flexibility, strength and durability. The outer skin surfaces of the suspension rim so produced have a rubber-like surface texture and protect the suspension rim from the adverse effects of ultraviolet radiation and other environmental conditions.

11 Claims, 2 Drawing Sheets

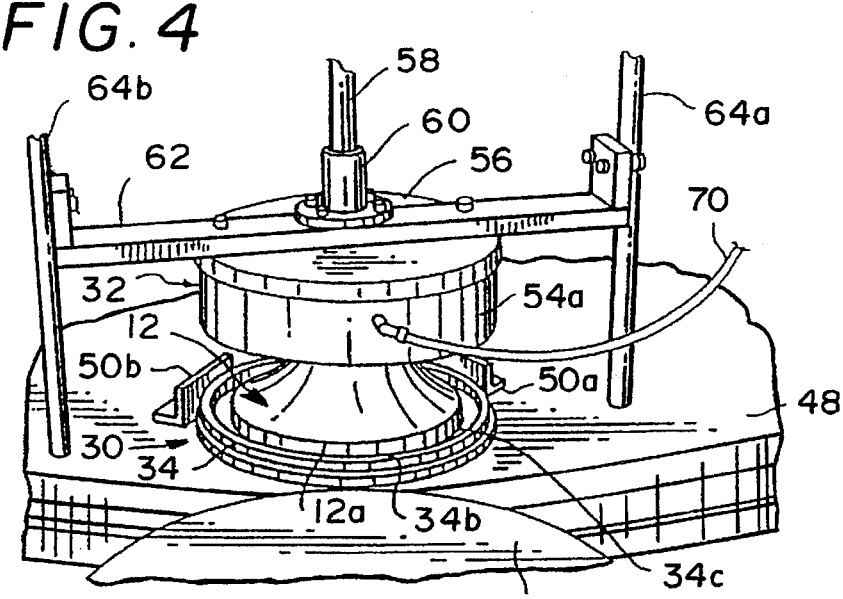
FIG. 4
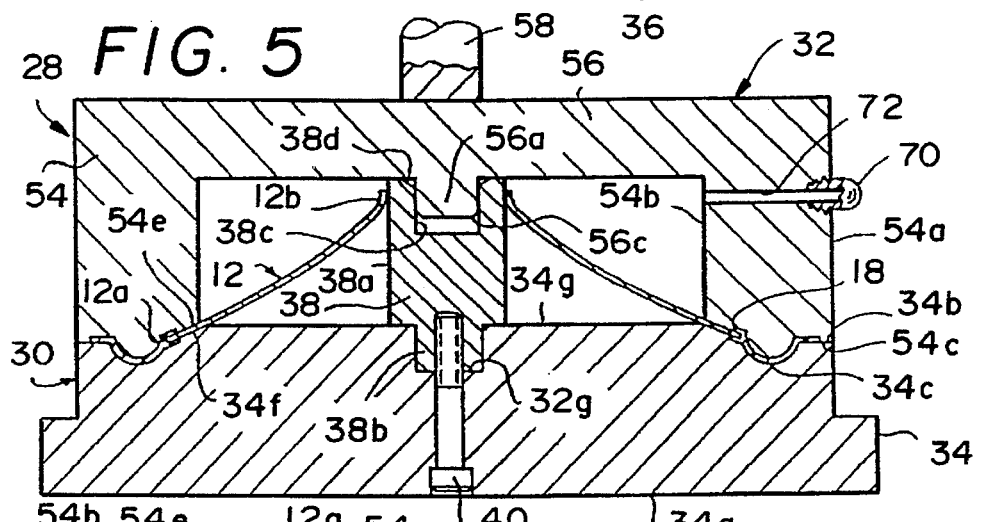
FIG. 5
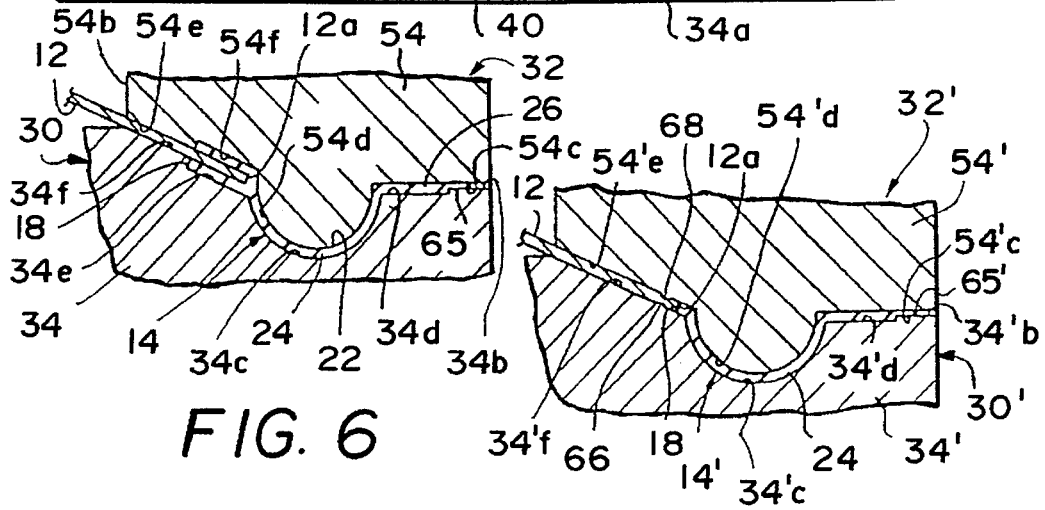
FIG. 6
FIG. 7

METHOD FOR MAKING A LOUDSPEAKER CONE WITH AN INTEGRAL SURROUND

This application is a continuation-in-part of application Ser. No. 08/248,145, which was filed on May 24, 1994.

BACKGROUND OF THE INVENTION

The present invention pertains generally to loudspeaker cones, and more particularly to method for making a novel loudspeaker cone assembly which has an integral surround.

Loudspeaker cones (or loudspeaker diaphragms) are well known. In the prior art, a fibrous or felted paper-type cone or diaphragm is adapted to be supported on a support frame through an annular suspension member (or rim). This annular member is also known as a surround. The surround is secured to the outer marginal edge of the cone and has predetermined elastic or flexibility properties. The surround may be formed as an integral generally radially directed extension of the periphery of the cone or diaphragm, as disclosed in U.S. Pat. Nos. 1,872,583, 2,302,178, and 4,646, 874, or may be formed as a separate annular supporting flange or rim affixed to an outer peripheral edge of the cone, such as disclosed in U.S. Pat. Nos. 2,840,177 and 3,634,052. Alternatively, the loudspeaker cone or diaphragm may be formed of plastic material such as disclosed in U.S. Pat. No. 3,858,680.

With the advent of relatively sophisticated sound reproduction systems, such as in stereophonic sound systems, the dynamic or moving coil-type loudspeaker cones used for the mid and low frequency ranges are subjected to relatively high amplitude vibrations in the axial direction of the cone. Movement along the cone axis is called excursion; modern woofers, in particular, may be designed for very long excursions. Excursions of two centimeters are possible. In the past, many manufacturers of larger size loudspeaker cones have made the suspension rims, or surrounds, from rubber in order to achieve desired flexibility and durability. A drawback to the use of rubber suspension rims is their relatively high cost.

To overcome the higher cost of rubber speaker cone suspension rims, attempts have been made to manufacture the suspension rims from plastic foam material. One method for making plastic foam-type suspension rims entails cutting a bulk block of raw foam material into slices or sheets of predetermined thickness. A foam sheet is then placed between heated dies which form an annular rim after which the rim is affixed to the outer edge of a cone, generally by means of an adhesive or sewing.

This technique has not been totally successful because the process involves production of large quantities of excess cut foam pieces which must be disposed of as scrap. Another drawback is that the cut foam rims generally have insufficient strength and structural integrity to support larger diameter speaker cones. A suspension rim made from a double layer of cut foam sheets in a laminated construction by a similar heated die process was found to provide improved suspension rims, however.

Cut foam suspension rims also are given to deterioration over time, this is known as "foam rot". Foam rot is accelerated by sunlight, high humidity or high temperatures.

A drawback to all known prior methods or techniques for making loudspeaker cone suspension rims is that they do not facilitate economical manufacture of rims in small lots of different colors, as may be desired for various applications.

Thus, a need exists for a loudspeaker cone assembly having a suspension rim which exhibits desired strength, flexibility and durability and which is economical to manufacture. Further, a relatively low cost suspension rim which was high strength adhesion to the rim of the speaker cone and which can be economically manufactured with various surface colors would find wide acceptance.

In the prior art, injection molding of foam onto a loudspeaker cone has been discussed as a means to mitigate some of these shortcomings. The applicant has discovered that injection molding is not suitable for loudspeaker surround applications, however, since polyurethane foam is excessively viscous and sticky for injection molding at the thicknesses required for a loudspeaker cone surround.

SUMMARY OF THE INVENTION

One of the primary objects of the present invention is to provide a method for making a novel loudspeaker cone assembly having a cone body and a resilient suspension rim formed of liquid plastic material and integrally connected to a peripheral outer edge of the cone body.

A more particular object of the present invention is to provide a novel loudspeaker cone assembly and method of making the cone assembly wherein a plastic foam suspension rim is formed integral with an outer peripheral edge of the cone body by impregnation of the foam rim to the outer edge of the core body.

Another object of the present invention is to provide a novel loudspeaker cone assembly as aforedescribed wherein the suspension rim is formed from a plastic foam in a manner to form high density closed-cell outer skin surface on the suspension rim, and wherein the outer skin surfaces form an integral sandwich construction with a low density closed-cell inner core to provide a suspension rim having improved strength, flexibility and durability.

A further object of the present invention is to provide a novel relatively low-cost loudspeaker cone assembly as described, and a method of making the cone assembly wherein a cone body having an outer free edge is placed within an open female mold having an annular channel or cavity configured to form the suspension rim with the free edge of the cone exposed to the channel. A predetermined quantity of liquid plastic foam is deposited into the channel of the open mold. Next, a first interval, called cream time, is allowed to pass while the die remains open. After cream time has passed, the mold is then substantially closed by a male die so as to seal the cone body adjacent its outer free edge. The foam is then cured under specific pressure and temperature conditions, over a second interval called rise time, so that the resulting annular suspension rim is integrally impregnated into the free outer edge of the cone body and forms high density closed-cell outer skin surfaces in an integral sandwich construction with a low density closed-cell inner core, thereby providing improved flexibility, strength and durability. The outer skin surfaces also protect the suspension rim from the adverse effects of ultraviolet radiation and other environmental conditions.

An object of this invention is to make cones with surrounds of uniformly high quality. It has been discovered that unless care is taken in practicing this method, pinholes and other imperfections in the surrounds may result. It has also been discovered that the ambient temperature and humidity are important factors in producing uniformly satisfactory cones and surrounds. Accordingly, this method may be practiced within a temperature and humidity controlled enclosure.

Another object of the present invention lies in the use of a mold and die assembly for making a speaker cone wherein a female mold and male die are cooperative to receive and seal an outer peripheral edge of the speaker cone body to prevent undesired flow of liquid plastic onto the cone as the liquid plastic fills a cavity in the die assembly and integrally connects to the edge of the cone body exposed within the cavity.

A feature of this method of loudspeaker cone assembly is that a color coating may be applied to a selected exposed surface area of the annular suspension rim in manner enabling economical short run production of different color suspension rims which are integrally affixed to the outer free edges of associated speaker cone bodies during the manufacturing process. Wet look cones may also be produced by spray priming the cone with a gloss enhancing agent before placing the cone in the open mold.

Another feature of the loudspeaker cone assembly in accordance with the invention lies in forming the plastic foam suspension rim so that, in one embodiment, an inner peripheral edge of the rim impregnates opposite surfaces of the cone body adjacent its outer edge, while in another embodiment the inner peripheral edge of the rim forms an integral butt-joint connection to the outer edge of the cone body.

This method of open-pour casting is to be distinguished from injection molding since the polyurethane foam of the preferred embodiment is excessively viscous and sticky for injection molding at the thicknesses required for a loudspeaker cone surround. Open pour casting is well suited to handling this material in the desired shapes and thicknesses.

This method may also be practiced with an elastomer liquid material in place of the polyurethane foam. The elastomer liquid is a mixture of polyurethane and isocyanate.

Further objects, features and advantageous of the present invention, together with the organization and manner of opposition thereof, will become apparent from the following detailed description of the invention when taken in conjunction with the accompanying drawings wherein like reference numerals designate like elements throughout the several views.

BRIEF DESCRIPTION OF THE DRAWINGS

The foregoing and additional objects, features and advantages of the invention will become apparent to those of skill in the art from the following detailed description of a preferred embodiment, taken with the accompanying drawings, in which:

FIG. 4 is a perspective view illustrating a further step in forming the suspension rim in integrally connected relation to the speaker cone body in accordance with the present invention;

FIG. 5 is a vertical longitudinal sectional view illustrating the female mold and male die in cooperating relation during forming of a foam suspension rim on the outer edge of a speaker cone body in accordance with the invention;

FIG. 6 is an enlarged fragmentary sectional view illustrating the sealing relation of the female mold and male die with the cone body in accordance with one embodiment of the invention; and FIG. 7 is an enlarged fragmentary detail view similar to FIG. 6 but illustrating an alternative manner of sealing the cone body between the female mold and male die, and with the suspension rim affixed to the outer free edge of the cone body through a butt-joint connection.

DETAILED DESCRIPTION

Figure 1:
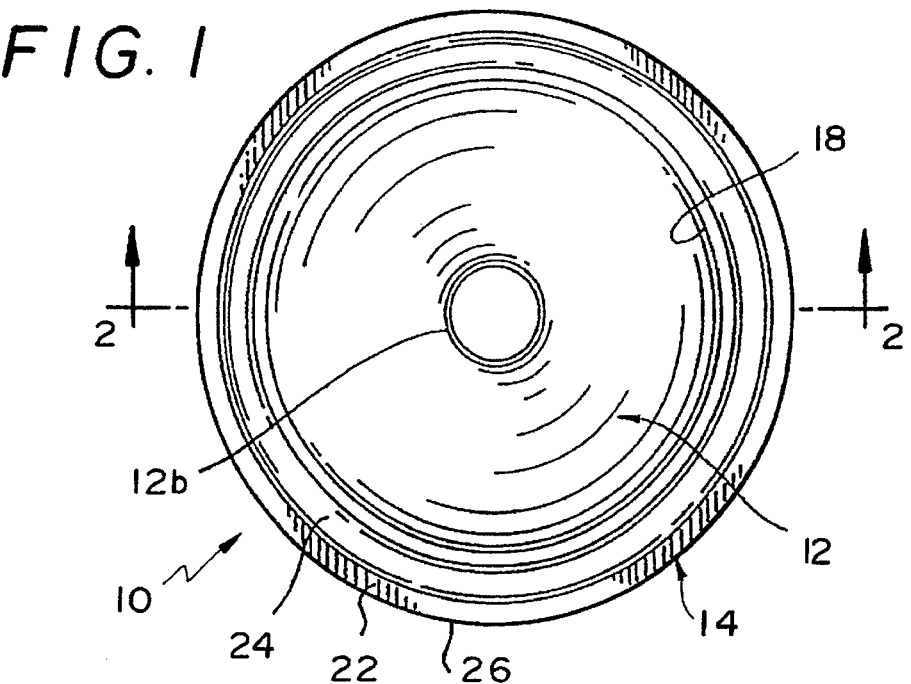
FIG. 1 is a front elevational view of a loudspeaker cone assembly constructed in accordance with the present invention.
Figure 2:
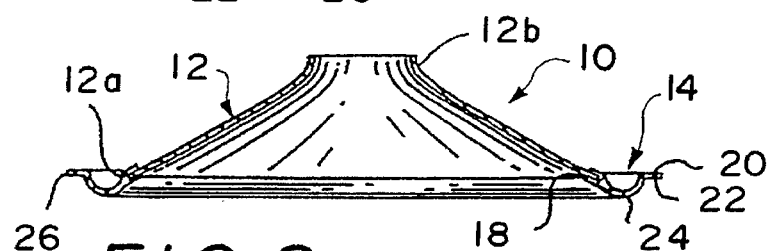
FIG. 2 is a transverse sectional view taken substantially along line 2—2 of FIG. 1.

Referring now to the drawings, and in particular to FIGS. 1 and 2, a loudspeaker cone assembly constructed in accordance with the present invention is indicated generally at 10. The loudspeaker cone assembly 10, which may alternatively be termed a speaker cone or acoustic diaphragm, includes a sound radiating cone body or element 12 and an annular suspension rim 14. The suspension rim 14 is integrally connected to an outer peripheral edge 12a of the cone body 12 and facilitates attachment or mounting of the loudspeaker cone assembly to support means such as the support frame of an acoustic device as speaker cabinet, as is known. In the illustrated embodiment, the cone body 12 has a generally frustoconical configuration having a concave curvalinear annular profile, as illustrated in FIG. 2. The illustrated cone body 12 has a circular outer peripheral edge 12a and an annular generally cylindrical neck portion 12b extending in the axial direction of the cone and to which a voice coil or the like may be attached in a conventional manner. Alternatively, the cone body 12 may have an elliptical or square outer peripheral edge, with the peripheral wall of the cone body being correspondingly modified from a generally conical configuration to accommodate the shape of the selected outer edge.

In the illustrated embodiment, the cone body 12 has a fibrous or felted paper construction which may be formed by a conventional felting process as conventionally employed in the manufacture of paper cones. For example, the cone body or diaphragm 12 may be formed by a feramonous form, such as a screen, having the desired configuration of the finished cone or diaphragm. The feramonous form is submerged in a water suspension of paper fibers and suction is applied to one side of the form so as to draw the suspension therethrough. Pelting of the paper fibers occurs on the form opposite the side through which the suction is applied until the desired thickness of fibers are built up on the form to establish a peripheral wall of generally uniform thickness from the free edge of the next portion 12b to the outer free edge 12a of the cone body. The felted form is then dried sufficiently to enable removal of the fibrous cone body from the feramonous form. Conventionally, the cone body 12 is formed to a thickness in the range of approximately 0.006–0.070 inch. The making of felted or fibrous cone bodies is an old well established art as exemplified by the aforementioned U.S. Pat. No. 1,872,533 which is incorporated herein by reference. Alternatively, the cone body 12 may be made of a suitable plastic material having a configuration substantially identical to the described cone body 12.

In accordance with one feature of the present invention, the annular suspension rim 14 is made from a plastic foam material such that an inner peripheral edge 18 of the suspension rim 14 is integrally affixed to the outer free edge 12a of the cone body 12. Suspension rim 14 may also be termed a surround. As will be described, the plastic foam annular suspension rim 14 is formed in a manner to establish high density closed-cell skin surfaces on both the inner and outer exposed surfaces of the suspension rim, as indicated at 20 and 22, respectively, in FIG. 2. The high density closed-cell skin surfaces 20 and 22 are formed in an integral sandwich construction on opposite sides of a closed-cell cellular inner core having lower density than the high density skin surfaces.

In the illustrated embodiment, the suspension rim 14 is formed to define a forwardly extending annular surface 24 which is of generally uniform radius, as considered in transverse cross section in FIG. 2. The annular surface 24 is integral with the inner peripheral edge portion 18 and the generally radial outer peripheral flange portion 26 of the suspension rim 14. The forwardly extending annular surface 24 need not have a uniform radius, but may have a curvature which provides a variable rim thickness from its inner peripheral edge 18 to its outer free edge.

The plastic foam material from which the suspension or supporting rim 14 is formed preferably comprises a closed-cell polyurethane foam such as available in liquid state from Plast-O-Meric, Inc., North Baltimore, Ohio, under its product identification No. SSF-1782 Polyurethane System. If desired, one or more filler materials such as microscopic size glass beads, talcum powder or other desired filler, may be added to the liquid plastic foam prior to forming the suspension rim 14. Newer CFC-free foams may also be used.

Another embodiment employs an elastomer liquid instead of the liquid polyurethane foam; for purposes of a generic nomenclature, both of these compositions are liquid plastics. The elastomer liquid is a mixture of about one quarter isocyanate and three quarters polyurethane. Ideally, the mixture is composed of 28.7% isocyanate and the rest is polyurethane. The acceptable range for isocyanate is approximately 20 to 35 percent. For purposes of describing the method, the polyurethane foam embodiment will be described. The inventor has discovered that the method may also be practiced with the elastomer liquid.

Briefly, the suspension rim 14 is formed by a low pressure open-pour casting process wherein a predetermined volume by weight of the liquid polyurethane foam is deposited into a tool, indicated generally at 28 in FIG. 5, at atmospheric pressure. The liquid foam is preferably deposited in a continuous bead into an open annular cavity in a female mold portion 30 of the tool 28. The female mold 30 supports a cone body 12 with its outer peripheral edge 12a exposed within the annular cavity. After the foam has been poured, a male die 32 is brought into cooperation with the female mold to establish a substantially closed annular chamber having a configuration identical to the desired configuration of the suspension rim 14. The liquid foam is deposited in sufficient volume to totally fill the annular chamber when expanded and cured. The foam both impregnates the exposed outer peripheral edge 12a of the cone body 12 to form an integral connection therewith, and forms the high density closed-cell outer skin surfaces 20 and 22 in an integral sandwich construction with a lower density cellular inner core. After curing, the suspension rim 14 and associated cone body 12 are removed from the tool 28 in substantially the form of the loudspeaker cone assembly 10.

In the following described method of making the suspension rim 14 so that it is integrally connected to the outer edge 12a of the cone body 12, the suspension rim is preferably formed to a thickness in the range of approximately 0.014 to 0.070 inch, depending upon the intended application of the loudspeaker cone assembly being manufactured, although other rim thicknesses or a rim having a variable thickness across its transverse section, may be desirable for some applications.

Figure 3:
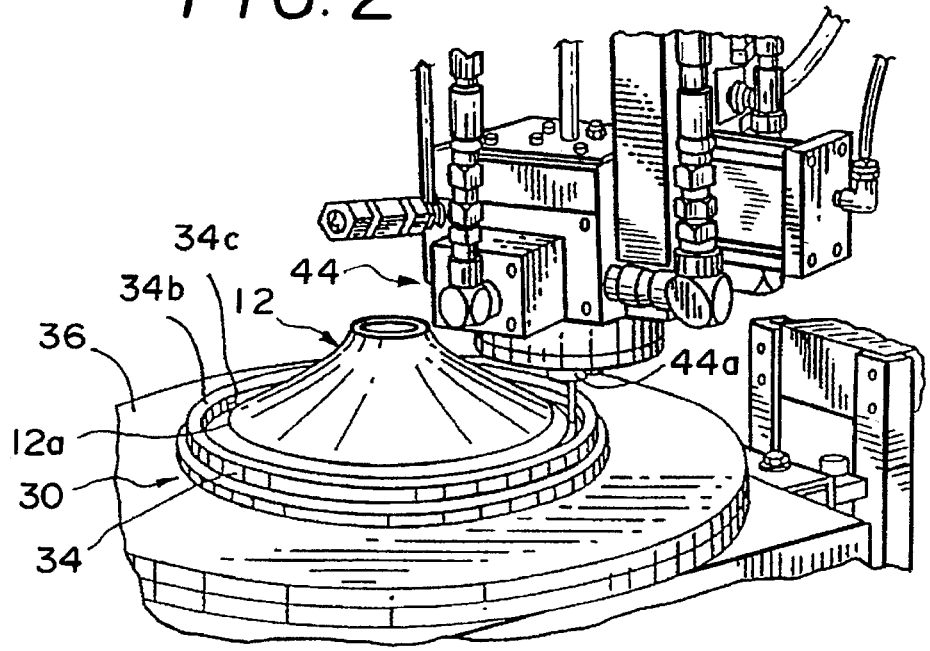
FIG. 3 is a perspective view illustrating the step of depositing a bead of liquid plastic foam into a female mold to form the suspension rim in accordance with the method of the invention.

Referring now to FIGS. 3–6 for a more detailed description of the method for making the loudspeaker cone assembly 10, the female mold 30 is made of a suitable rigid material, such as a suitable metallic or plastic material, and has a base 34 having a flat base surface 34a adapted to be placed on a turntable or the like, such as indicated at 36 in FIG. 3, coaxially with the axis of rotation of the turntable. In the illustrated embodiment, the base 34 is generally circular. However, where the suspension rim 14 is to have a non-circular configuration, such as an elliptical or square plan configuration, the base 34 may have a corresponding outer periphery. The female mold 30 has an upper annular planar surface 34b formed parallel to the lower base 14a. An annular cavity or groove 34c of substantially uniform radius or semi-circular transverse cross section is formed in the planar surface 34b and is radially intersected by an annular recessed planar surface 34d of a radial width substantially equal to the radial dimension of the annular flange 26 on the suspension rim 14. The inner peripheral boundary of the annular cavity 34c is intersected by an annular conical surface 34e which is concentric with but depressed from a conical surface 34f having a contour substantially equal to the contour of the cone body 12 adjacent its outer free edge 12a. The annular surface 34f intersects an upper planar surface 34g on the female mold and serves as a pilot surface to be engaged by the inner surface of the cone body 12 when placed on the female mold 30 during the manufacturing process. As will be described, the conical surface 34f also cooperates with a similarly configured and mutually opposed conical surface 54e on the male die 32 to secure and seal the outer peripheral edge portion of a cone body during forming of a suspension rim on the outer edge of the cone body.

A cone body locating post 38 is mounted on the base portion 34 of the female mold 30 in coaxial relation therewith. In the illustrated embodiment, the post 38 has a cylindrical outer surface 38a sized to receive the neck position 12b of a cone body 12 in sliding relation when the cone body is supported on the female mold in coaxial relation engaging the surface 34f and with the free outer edge portion of the cone body extending above and parallel to the recessed conical surface 34e on the female mold. The post 38 has a smaller diameter coaxial cylindrical boss 38b which is snugly received with a cylindrical recess 32g formed coaxially in the base portion 34 and is fixed therein by means of a bolt 40. The small diameter boss 38b allows different diameter posts to be mounted on the female mold to accommodate cone bodies having different diameter neck portions 12b.

With the female mold 30 positioned coaxially on the turntable 36 as illustrated in FIG. 3, a plastic foam mixing and dispensing head 44 having a discharge nozzle 44a is brought into position overlying the female mold such that the discharge nozzle directly overlies the annular channel 34c. The mixing and dispensing head 44 is of known design and has controls associated therewith (not shown) operative to provide a timed discharge of liquid foam from the discharge nozzle correlated to the rotational speed of the turntable 36. The dispensing head 44 may be supported by an articulated support arm (not shown) enabling movement of the dispensing head from a position spaced from the turntable to a position overlying the annular groove or cavity 34c, and vice-versa. If desired, a suitable release agent may be wiped onto the female mold to lightly coat the annular groove 34c and the adjacent recessed surface 34d and 34e. Alternatively, these surfaces may be coated with TEFLON brand PTFE.

With the dispensing head 44 so positioned, a bead of liquid plastic foam of the aforedescribed type is discharged into the annular groove 34c simultaneously with rotation of the turntable 36 at a predetermined rotational speed in relation to the rate of discharge from the dispensing head. This relationship is established so that a predetermined volume by weight of plastic foam is deposited into the annular groove 34c in a continuous but not overlapping bead. The volume by weight of liquid plastic foam discharged into the annular groove 34c is substantially equal to the volume and weight of foam in the suspension rim 14 on the completed loudspeaker cone assembly 10. Conversely, the female mold 30 may be supported on a stationary support and the dispensing head 44 moved through a path overlying the annular groove or cavity 34c to effect discharge of a bead of foam about the full periphery of the groove or cavity.

After depositing a bead of liquid plastic foam into the annular groove 34c, rotation of the turntable 36 is terminated and the dispensing head 44 is moved away from the turntable. The female mold 30 is then transferred to a curing work station. In the illustrated embodiment, the curing station includes a horizontal support surface 48 which is preferably closely adjacent and substantially coplanar with the upper support surface on the turntable 36. The support surface 48 may comprise a portion of a substantially larger rotatable turntable which defines a plurality of work stations about its periphery at substantially equal circumferentially spaced positions on the surface 48. A pair of upstanding locating or stop brackets 50a and 50b serve to abut and locate the female mold 30 at the curing work station when moved onto the support surface 48.

The male die 32 has an annular wall 54 defined between coaxial outer and inner cylindrical surfaces 54a and 54b, respectively. The outer surface 54a has diameter substantially equal to outer diameter of the base portion 34 of the female mold 30 adjacent the annular surface 34b. The annular wall 54 is formed integral with and depends from a circular plate 56 which is fixed at its center to the lower end of a vertically reciprocable piston rod 58. The piston rod 58 extends axially from a vertically disposed double acting pneumatic or hydraulic cylinder (not shown) and is guided through a guide bushing so supported on a bracket 62 between a pair of support posts 64a and 64b. The male die 32 is vertically movable through selective actuation of the double acting cylinder from a position spaced above the female mold 30, as illustrated in FIG. 4, to an operating position wherein an annular planar surface 54c on the annular wall 54 engages or bottoms against the annular surface 34b on the female mold 30. Preferably, vent means in the form of one or more radial grooves, one of which is indicated at 65 in FIG. 6, are formed in the annular surface 34b on the female mold to accommodate expansion of the foam deposited into the cavity 34c. The venting grooves 65 thus serve as a pressure relief of expansion path for the liquid plastic foam during expansion and curing as will be described.

A pilot boss 56a is formed coaxially on the underside of the circular plate 56 for sliding entry into a cylindrical recess 38c formed coaxially in the cone locating post 38. Preferably an annular chamfer surface 38d is formed on the post 38 concentric with the cylindrical recess 38c. An annular chamfer 56c is also formed at the lower end of the pilot boss 56a to facilitate entry into the recess 38c.

The annular wall 54 of the male die 32 also has an annular convex surface 54d and an annular frustoconical surface 54e formed on its lower end which are configured to lie in predetermined parallel spaced relation to the concave cavity surface 34c and conical surfaces 34e and 34f on the female mold 30 when the male die is in its lowered operating position relative to the female mold, as shown in FIG. 6. The annular surface 54e on the male die 32 is spaced above the annular inclined or conical surface 34f by a distance slightly less than the nominal wall thickness of the cone body 12 so that the mutually opposed surfaces 34f and 54e engage the cone body and maintain it firmly in position between the male die and female mold when the male die is lowered to its operating position relative to the female mold. The mutually opposed surfaces 34f and 54e effect a sealing relation with the interposed wall of the cone body 12 to prevent blow-by or the passage of liquid plastic foam from the suspension rim cavity established between recessed surface 34e and the mutually opposed annular recessed surface 54f on the lower end of the male die.

The annular convex surface 54d on the male die 32 is substantially semi-circular in transverse cross-section so that when the male die is lowered into operating position with the lower female mold 30, a substantially closed chamber is established having a transverse cross-sectional profile and volume substantially equal to the desired cross-sectional configuration of the suspension rim 14 on the loudspeaker cone assembly 10. With a cone body 12 mounted on the female mold over the post 38, the free outer peripheral edge 12a of the cone extends a predetermined distance, such as approximately 0.0625–0.125 inch, into the cavity established between the mutually opposed surfaces 34e and 54f. In similar fashion to the female mold 30 and its annular cavity or groove 34c, the male die 32 may be modified so that the wall 54, and its planar surface 54c, have a configuration corresponding to the shape selected for the female mold which, in turn, is dependent on the configuration of the cone body 12 and corresponding suspension rim selected. Similarly, the transverse curvature of the annular convex surface 54d on the male die 12 may be configured so that it is not parallel to the cavity surface 34c on the female mold, thereby providing a variable thickness rim as desired.

In the preferred embodiment, the male die 32 is not lowered until a first interval of time has passed. This first interval of time is selected to be sufficient to allow the plastic foam to cream. This first interval is termed cream time. After the cream time has passed, the male die 32 may be lowered over the female mold.

Lowering the male die 32 into operating position with the female mold 30 causes the deposited bead of liquid plastic foam to substantially fill the closed suspension rim chamber and simultaneously embed the exposed peripheral edge 12a of the cone body 12 exposed between surfaces 34e and 54f. During expansion and curing, the liquid plastic foam impregnates the exposed inner and outer surfaces of the cone body adjacent its outer free edge 12a. As previously described, as the plastic foam expands, it forms high density closed-cell outer skin surfaces on the suspension rim 14 in an integral sandwich construction with an interposed lower density cellular core. This expansion is called a rise. A second interval must pass at this point in the process. The second interval is called the rise time. The rise time begins after the male die and female mold are closed and the die and mold cannot be opened until the rise time is complete. Cream time and rise time vary with the foam material used and with temperature.

The suspension rim's high density closed-cell skin surfaces are thereby produced. These high-density closed cell surfaces have a rubber-like quality and protect the suspension rim 14 from the adverse effects of environmental conditions, such as ultraviolet rays which can lead to premature deterioration as experienced with prior foam speaker cone suspension rims.

If an elastomeric liquid is used as the liquid plastic instead of the polyurethane foam, then the time for which the die is closed is termed close time. Close time also varies with material and temperature, but for an ambient temperature of approximately 80 degrees fahrenheit (and the elastomer mixture described above) the close time is about one minute. The range of close times has been observed as approximately 30 seconds to two minutes.

It has been discovered that unless care is taken in practicing this method and closely monitoring these times and temperatures, pinholes and other imperfections in the surrounds may result. It has also been discovered that the ambient temperature and humidity are important factors in producing uniformly satisfactory cones and surrounds. Accordingly, this method may be practiced within a temperature and humidity controlled enclosure. An ambient temperature of approximately 80 degrees and a relative humidity of 30 to 40 percent can be maintained within the enclosure. Conditions of steady temperature and humidity permit the practitioner to choose the precess times and temperatures more precisely.

FIG. 7 illustrates an alternative, and often preferred, embodiment of the manner of attaching an annular suspension rim, indicated at 14', to the outer peripheral edge 12a of a cone body 12 in a butt-joint connection. In the embodiment of FIG. 7, structural elements similar to the elements illustrated in FIG. 6 are represented by corresponding primed reference numerals. The annular recessed surface 34e on the female mold 30 and the annular recessed surface 54f on the male die 32 are eliminated and/or is used with different thickness cone bodies. When it is desired to increased the thickness of the suspension rim 14, annular shims may be mounted between the abutting stop surfaces 34b and 54c on the female mold and male die.

Returning again to FIG. 5, the upper die 32 is moved into its operating position with the female mold 30 in a manner to prevent separation or lifting of the male die 32 from the female mold during expansion and curing of the liquid plastic foam. This may be accomplished by pressurizing the associated double acting cylinder to prevent upward movement of the male die until intended release of the applied retaining force. It has been found that when a quantity of liquid plastic foam sufficient to form the suspension rim 14 is deposited within the annular cavity 34c in the female mold 30 and caused to expand with the male die 32 positioned to establish a substantially closed chamber with the annular cavity, a reactive pressure is created within the chamber. This pressure is resisted by applying sufficient pressure to the double acting cylinder which actuates the piston 58, or by selective use of toggle linkage type clamps acting on the male die 32.

With the male die 32 in operative relation with the female mold 30, and with liquid plastic foam deposited within the rim cavity 34c as described, the closed tool 28 is heated to approximately 120° F. so that the liquid foam within the annular cavity is subjected to approximately 120° F. during expansion and curing of the foam. Heating of the female mold 30 and male die 32 of the tool may be carried out by any suitable heating means. In a preferred embodiment, the closed tool 28 is moved into a heating oven which may be formed to extend partially about the turntable 48 so that indexing the turntable causes the closed mold to be disposed within the heating oven for a predetermined period of time.

If a liquid elastomer is used, the mold is heated to a curing temperature of 90 to 100 degrees fahrenheit for 25 to 30 minutes.

In accordance with another feature of the invention, a color coating may be applied to selected exposed surface areas on the annular suspension rim 14. If color coating is desired, such as on the forward exposed surface 22 of the rim 14, a release agent, such as commercially available from Moline Paint Manufacturing Co., Moline, Ill., under its product identification No. MPM 11-X150A, is applied to the surfaces 34c–e prior to depositing the liquid foam into the annular cavity 34c in the female mold. A selected urethane color coating, such as a urethane color coating available from Moline Paint Manufacturing Co. under its ALIPHLEX® System, is then applied as by spraying onto the mold surfaces 34c–e. If desired, a color coating having a release agent mixed therein may be used, thereby eliminating application to the female mold of a separate release agent. Also, fillers such as microscopic size glass beads, talcum powder or additives giving the coating a pearlescent finish could be added to the color coating applied to the mold surfaces 34c–e.

Preferably a shield, such as a paper shield having the shape of the cone body 12, is placed over the cone guide post 38 to mask off and shield the surfaces 34g and 34f from the color coating spray. Alternatively, the color coating may be sprayed onto the female mold surface 34c–e by an electrostatic process so that no shield is needed. During curing of the liquid foam within the closed cavity between the female mold and male die, the color coating, as selectively applied to the female mold, is transferred to and adheres to the corresponding outer exposed surface areas of the suspension rim 14. After curing of the liquid foam, the male die 32 is raised from the female mold and the resulting finished loudspeaker cone assembly is removed. It will be appreciated that selected surface areas on the inner surface 20 of the suspension rim may be provided with a color coating in a similar manner. In addition to providing a desired aesthetic appearance, the color coating further enhances the resistance of the suspension rim to adverse environmental conditions.

If liquid elastomer is used, it has been observed that black elastomer is the preferred color, since this leads to finished product with fewer pin-hole defects than for other colors.

If desired, an air pressure conduit, such as indicated at 70 in FIG. 4, may be secured at one end to the outer surface 54a of the male die so as to communicate with the open space above a cone body 12 supported between the female mold 30 and male die 32' as through an air passage 72 formed in the annular wall 54. The opposite end of the pressure conduit 70 is connected through a control valve (not shown) to a suitable air pressure source. Air pressure may be manually or automatically introduced into the annular chamber above the cone body 12 when the male die is raised from the female mold to assist in release of the speaker cone assembly from the male die.

Thus, in accordance with the present invention, a loudspeaker cone assembly is provided which includes a flexible suspension or supporting rim 14 having high density closed-cell skin surfaces disposed on opposite sides of a lower density closed-cell internal core in an integral sandwich construction. The thus formed suspension rim is impregnated into and integrally connected to the outer circumferential edge 12a of the cone body 12 either in overlapping relation on both sides of the peripheral edge of the cone body such that the outer edge of the cone is embedded within the suspension rim, as illustrated in FIG. 6, or by a butt-joint connection, as illustrated in FIG. 7. Further, a selected color coating may be economically applied to selected exposed surface areas of the flexible mounting rim. For example, when the speaker cone is to be mounted within a loudspeaker support frame with the suspension rim visible to the user, color coating of the outer surface 22 of the suspension rim may be desirable to provide a particular color scheme. The integral sandwich construction of the suspension rim 14 greatly improves the strength, flexibility and durability of the suspension rim over prior foam loudspeaker suspension rims.

The foregoing describes the preferred embodiments of the present invention along with a number of possible alternatives. A person of ordinary skill in the art will recognize that modifications of the described embodiments may be made without departing from the true spirit and scope of the invention. The invention is therefore not restricted to the embodiments disclosed above, but is defined in the following claims.

I claim:

1. A method of making a loudspeaker cone assembly which includes a cone body having an outer edge, and an annular flexible suspension rim having an inner peripheral edge fixed to the outer edge of the cone body and defining inner and outer exposed surfaces, said method comprising the steps of:
   a. positioning the cone body on a mold having an annular cavity defined by a transverse contour substantially identical to the desired contour of the outer surface of said rim, said cone body and annular cavity being mutually cooperable so that the outer edge of the cone body is exposed to said cavity;
   b. depositing a bead of liquid plastic into said annular cavity along substantially its full circumferential length;
   c. positioning a die on said mold so as to form with said cavity a substantially closed annular chamber circumferentially of the outer edge of the cone and having a transverse profile substantially identical to the desired transverse profile of said rim; and
   d. effecting expansion and curing of the liquid plastic so that the liquid plastic fills said chamber and impregnates the outer edge of the cone body whereby a flexible annular rim is formed which is integrally secured to the outer edge of the cone body.

2. The method as defined in claim 1 wherein the liquid plastic forms a rim construction having high density closed-cell skin surfaces on the rim and a lower density internal cellular core during expansion and curing of the liquid plastic.

3. The method as defined in claim 1 wherein said liquid plastic is deposited into said cavity in a quantity sufficient to establish an expansion pressure within the chamber during expansion of the liquid plastic.

4. The method as defined in claim 1 wherein the step of effecting expansion and curing of the liquid plastic includes heating said mold and die so as to heat the liquid plastic to a temperature in the range of 90° to 120° F. during curing.

5. The method of claim 1 including the step of applying a glossy primer coating on a surface of said cone prior to positioning said cone body on said mold.

6. The method as defined in claim 1 wherein said liquid plastic is liquid polyurethane foam.

7. The method as defined in claim 1 wherein said liquid plastic is an elastomer liquid consisting of a mixture of polyurethane and isocyanate and further comprising the step of mixing the polyurethane and isocyanate.

8. The method of claim 7 wherein the elastomer liquid is black.

9. The method of claim 1 further comprising the step of providing an enclosure having controlled temperature and humidity.

10. A method of making a loudspeaker cone assembly which includes a cone body having an outer edge, and an annular flexible suspension rim having an inner peripheral edge fixed to the outer edge of the cone body and defining inner and outer exposed surfaces, said method comprising the steps of:
   a. positioning the cone body on a mold having an annular cavity defined by a transverse contour substantially identical to the desired contour of the outer surface of said rim, said cone body and annular cavity being mutually cooperable so that the outer edge of the cone body is exposed to said cavity;
   b. depositing a bead of liquid plastic into said annular cavity along substantially its full circumferential length;
   c. positioning a die on said mold so as to form with said cavity a substantially closed annular chamber circumferentially of the outer edge of the cone and having a transverse profile substantially identical to the desired transverse profile of said rim;
   d. effecting expansion and curing of the liquid plastic so that the liquid plastic fills said chamber and impregnates the outer edge of the cone body whereby a flexible annular rim is formed which is integrally secured to the outer edge of the cone body; and,
   e. selectively applying a color coating to the exposed surface of said annular cavity, said coating being of the type adapted to transfer to the adjacent surface of the rim during forming of said rim.

11. A method of making a loudspeaker cone assembly which includes a cone body having an outer edge, and an annular flexible suspension rim having an inner peripheral edge fixed to the outer edge of the cone body and defining inner and outer exposed surfaces, said method comprising the steps of:
   a. positioning the cone body on a mold having an annular cavity defined by a transverse contour substantially identical to the desired contour of the outer surface of said rim, said cone body and annular cavity being mutually cooperable so that the outer edge of the cone body is exposed to said cavity;
   b. depositing a bead of elastomer liquid plastic consisting of a mixture of polyurethane and 28.7 percent isocyanate, by weight, into said annular cavity along substantially its full circumferential length;
   c. positioning a die on said mold so as to form with said cavity a substantially closed annular chamber circumferentially of the outer edge of the cone and having a transverse profile substantially identical to the desired transverse profile of said rim; and
   d. effecting expansion and curing of the liquid plastic so that the liquid plastic fills said chamber and impregnates the outer edge of the cone body whereby a flexible annular rim is formed which is integrally secured to the outer edge of the cone body.

* * * * *